Patented Oct. 21, 1947

2,429,484

UNITED STATES PATENT OFFICE 2,429,484

PURIFICATION OF KETONES AND KETOLS BY ALKALI TREATMENT AND DISTILLATION

Leslie M. Peters, San Francisco, Calif., assignor to Shell Development Company, San Francisco, Calif., a corporation of Delaware No Drawing. Application September 10, 1943, Serial No. 501,902

11 Claims. (Cl. 202—57)

This invention relates to a process for the purification of ketones and ketols. More particularly, it pertains to the purification and decolorization to a substantially water-white material of ketones and/or ketols which are contaminated with colored impurities in the nature of ketone and ketol oxidation products.

Ketones and ketols have many important industrial applications. For many uses, it is required that they meet very exacting specifications, one of which is that they be substantially water-white, that is, free from color-imparting impurities. It is sometimes difficult to meet this requirement since, although ordinarily ketones and ketols are relatively stable compounds, under certain conditions they oxidize to a certain extent to form colored oxidation products, e. g., aldehydes and especially colored alpha-diketones formed by the oxidation of one of the methylene groups adjacent to the carbonyl group of the monoketone. Methyl ethyl ketone, for example, may be partially oxidized to diacetyl when subjected to the action of oxygen under certain conditions to be described more fully hereinbelow. The presence of as little as 0.005% of alphadiketones, e. g., of diacetyl, may impart a discoloration to the ketone or ketol and render it unsuitable for many uses. Since these colored impurities usually have boiling points which are approximately the same as the boiling points of the ketones or ketols from which they are derived, and since they have a very considerable degree of coloring power, it is very difficult, if not impossible, to free the ketones and/or ketols from these colored substances and to make them water-white by distillation or other ordinary methods.

An illustration of one of the ways by which colored impurities are formed in ketone solvents is shown in the following. When various solvents are allowed to evaporate into the air from an applied coating composition, the solvents are sometimes recovered from the air by means of an adsorptive charcoal recovery system. The recovered solvents are then used again to manufacture more coating compositions and are thus not lost in the process. When solvents containing ketones are used in this manner, they often acquire a greenish to yellow color which makes them unsuitable for further use in the coating composition. As pointed out hereinabove, the development of this color is due in large part to the presence of small amounts of oxidation products formed by the action of the oxygen of the air on the ketones when they are in the presence of the charcoal, it being quite likely that the charcoal acts as a catalyst for the oxidative process. Unless these colored oxidation products are removed, the contaminated ketone solvent mixtures are soon rendered unfit for use in the solvent recovery system and must be discarded.

One method which has been developed for removing the aforesaid colored oxidation products comprising chiefly alpha-diketones is that described and claimed in U. S. Patent No. 2,204,956. According to the process disclosed therein, a ketone solvent which has been discolored by the presence of color-imparting diketone impurities is treated with ammonia or with a primary amine until it is substantially decolorized. The mixture is then distilled to separate the resultant water-white ketone from the ammonia or primary amine and from any high boiling products resulting from the combination of the ketone oxidation products with the ammonia or primary amine. Although this method is relatively effective in producing a water-white product, it has certain inherent disadvantages. The use of primary amines as treating agents has the obvious limitation that the primary amines are not always readily available and in any case are relatively expensive reagents to use commercially on a large scale for the purpose of purifying ketone solvents. If ammonia is available and is used as the treating material, its use is complicated by the fact that it is difficult to handle and that during operation of this process there is a continuous loss of ammonia because of its volatility. This necessitates the continuous addition of more ammonia and thus adds another element of expense to the operation of the process.

It is an object of the present invention to avoid the above and other defects of the prior art. It is another object to provide a simple, inexpensive, and efficient process for the removal of color-imparting impurities which frequently contaminate ketones and/or ketols and mixtures thereof with other neutral organic compounds. It is a further object to provide an effective method for removing oxidation products such as alpha-diketones from ketones and/or ketols and their mixtures with other neutral organic compounds by a method which is highly effective and economical since it is simple and easy to operate and makes use of readily available and inexpensive non-volatile reagents.

It has now been found possible to achieve the above and other objects by treating the contaminated ketone, or ketol, or mixture thereof with other neutral organic compounds, with a basic-acting metal compound and separating the purified ketone or ketol. Stated in greater detail, the purification process of the present invention may be carried out by adding to the ketone or ketol which is contaminated with colored impurities a sufficient amount of a basic-acting metal compound to react with the colored impurities so as to convert the said impurities to high molecular weight products from which the desired purified ketone or ketol may be readily separated by any desired means, as by distillation. In a preferred procedure the impure material may be heated at reflux temperatures for from about ¼ hour to about one hour with a sufficient amount of a dilute solution of a basic-acting metal compound to result in the formation of a mixture containing from about 0.1% to about 5.0% by weight of the said basic-acting metal compound, and distilling off the purified and water-white ketone or ketol or mixture thereof with other neutral organic compounds from the resinous polymeric materials into which the colored impurities, e. g., the alpha-diketones, aldehydes, etc., have been converted by the action of the alkali. This treatment does not destroy or harm the ketones or ketols or any of the other neutral compounds which may be present in the material treated. The action of the sodium hydroxide or other basic-acting metal compound appears to be specific to the colored impurities so that there is substantially no reaction with the other compounds which make up the material to be purified. It is therefore possible to completely remove the colored impurities from the solvent or solvent mixture, which may be recovered almost quantatively.

Other advantages reside in the fact that sodium hydroxide and the other basic-acting metal compounds which may be used in carrying out the process of the invention are relatively inexpensive reagents which are readily available and which are therefore applicable with economy to large scale commercial operation. They may be handled with facility in ordinary equipment and are relatively non-volatile, thus preventing loss during the purifying procedure.

It should also be emphasized that the use of the presently disclosed basic-acting metal compounds in the purification of ketone solvents is not an application of the method using ammonia or primary amines as described in U. S. Patent No. 2,204,956, referred to hereinabove, nor is it an obvious extension of that process. In the first place, the present process is superior to the process in which ammonia or primary amines are used as reagents for combining with the ketone oxidation products in that it is easier to carry out, gives higher yields of recovered solvent and results in the formation of a better product. Furthermore, the nature of the reaction taking place in the two processes is fundamentally different and makes them further distinguishable. When ketone oxidation products in the nature of alpha-diketones are reacted with ammonia, a well defined reaction occurs to form glyoxaline or its alkyl derivatives. This reaction is well known and is frequently referred to in the literature (cf. Meyer and Jacobsen, Lehrbuch der Organischen Chemie, vol. I, part 2, page 828; Beilstein, Handbuch der Organischen Chemie, vol. 23, page 84; supp., page 26). However, when ketone oxidation products in the nature of alpha-diketones are treated with a basic-acting metal compound, e. g., sodium hydroxide, resinous products of high molecular weight and high boiling point are formed. This result is therefore quite different and not to be expected or anticipated by a consideration of the aforementioned U. S. patent.

A wide variety of ketones or ketols containing colored oxidation products may be purified by the process described herein. The term "ketone" refers to such compounds as acetone, methyl ethyl ketone, methyl propyl ketone, diethyl ketone, methyl butyl ketone, methyl isobutyl ketone, mesityl oxide, cyclopentanone, cylohexanone, acetophenone, propiophenone, benzophenone and the like. The term ketol refers to compounds such as acetyl carbinol, propionyl carbinol, butynyl carbinol, acetoin, propionoin, butyroin, isobutyroin, pivaloin, hydracetal acetone, hydracetal ethyl methyl ketone, diacetone alcohol, acetopropyl alcohol, acetobutyl alcohol, benzoyl carbinol, benzoyl ethyl carbinol, benzoyl propyl carbinol, benzoyl butyl carbinol and the like. Removal of the colored impurities may also be effected from ketones and ketols mixed with one or a plurality of a wide variety of neutral organic compounds including alcohols such as methyl alcohol, ethyl alcohol, normal propyl alcohol, isopropyl alcohol, normal butyl alcohol, isobutyl alcohol, secondary butyl alcohol, tertiary buthyl alcohol, the amyl alcohols, the hexyl alcohols, etc.; esters such as methyl acetate, ethyl acetate, isopropyl acetate, normal butyl acetate, isobutyl acetate, secondary butyl acetate, the amyl acetates, methyl propionate, ethyl butyrate, ethyl isobutyrate, etc.; ethers such as diethyl ether, diisopropyl ether, the dibutyl ethers, the diamyl ethers, diallyl ether, dimethallyl ether, ethyl isopropyl ether, propyl butyl ethers, isopropyl tertiary butyl ether, secondary butyl tertiary butyl ether, allyl isopropyl ether, ethyl methallyl ether, etc.; hydrocarbons such as pentane, hexane, heptane, iso-octane, diisobutylene, octene, benzene, toluene, xylene, naptha, gasoline fractions, hydrogenated naptha, petroleum diluents, aromatic petroleum diluents, etc.; some halogenated hydrocarbons such as carbon tetrachloride, chloroform, ethylene dichloride, propylene dichloride, butylene dichloride, ethylene dibromide, trichlorethylene, phenyl chloride, etc., and water as well as homologues, analogues and suitable substitution products of these substances.

Although sodium hydroxide is a preferred substance for carrying out the process of the invention, any basic-acting metal compound capable of effecting the polymerization of the alpha-diketones present as colored impurities in the ketone or ketol or mixture thereof with other neutral organic compound may be used to convert the said alpha-diketones to resinous, polymeric substances which can be readily separated from the purified ketones or ketols. Sodium hydroxide, potassium hydroxide, sodium carbonate, potassium carbonate, and the hydroxides of the alkaline earth metals are preferred basic-acting metal compounds. These, as well as other basic-acting metal compounds, may preferably be added as aqueous solutions which are from about 0.1 N to about 2 N with respect to alkali. Any suitable solvent other than water may, however, be used or the basic-acting metal compound may be added directly in the solid form, if desired. The amount of basic-acting metal compound added to the impure solvent to be treated will obviously be dependent upon the amount of impurity present. It is only necessary that sufficient alkali be present to completely effect the catalytic polymerization of the alpha-diketone impurities to form high boiling resinous substances. For most commercial applications, a quantity of basic-acting metal compound which will result in the formation of a mixture containing from about 0.1% to about 5.0% by weight of basic-acting metal compound is a convenient and effective amount.

The treatment of the contaminated ketone or ketol with the basic-acting metal compound is, as has been indicated hereinabove, preferably carried out at atmospheric pressure and at a temperature high enough to produce and maintain a reflux, i. e., at about the boiling point of the said contaminated material. If desired, however, or necessary because of the nature of the solvent being purified, a lower temperature may be employed. Pressures lower or higher than atmospheric may be used as desired.

While distillation is the preferred method for separating the ketones or ketols and mixtures thereof with other neutral organic compounds from the treated mixture, other methods may be used if desired. For example, separation may be accomplished by means of extraction, filtration, centrifuging, and the like. Any suitable temperature and pressure may be used during the separation of the reaction product from the materials being treated, depending upon the method of separation utilized and the properties of the materials. When distillation is used for the separation, operation under subatmospheric pressure obviates the necessity of heating the material up to the normal boiling temperature. On the other hand, superatmospheric pressures are useful for distillation of low boiling liquids.

The process is adaptable to batch, intermittent or continuous operation. Separate vessels may be used, if desired, when purifying separate batches of contaminated material, or the operation may be made continuous by adding the aqueous solution of basic substance to the material to be treated and continuously feeding the mixture of basic substance and contaminated material into one or a plurality of reaction stages at approximately the same rate as the treated material is being withdrawn therefrom. The separation of the purified material from the reaction mixture may also be done continuously, as where the treated material from the reaction stages is passed continuously from a reflux column into a separating stage, such as a fractionating column.

The process of the invention is illustrated by the following examples without being limited thereto.

*Example I*

About 50 cc. of 1 N sodium hydroxide was added to 200 g. of a mixture comprising 20 g. of diacetyl, 20 g. of water and 160 g. of methyl ethyl ketone. The resulting mixture was heated to boiling and refluxed for about ½ hour. It was then diluted with 100 cc. of water and distilled to separate the purified methyl ethyl ketone from the high boiling resinous compounds formed by the polymerization of the diacetyl. Recovery of the water-white, purified ketone was practically quantitative.

*Example II*

A charge of 200 gallons of water, 2 gallons of 48° Baumé sodium hydroxide, and 600 gallons of a mixture comprising about 80% methyl ethyl ketone, 10% diacetyl and 10% water was placed in a still and refluxed for about four hours. The reaction mixture was then distilled to separate the purified methyl ethyl ketone from the high boiling, resinous by-products. The product was water-white in color and did not discolor on standing.

*Example III*

About 50 cc. of a 4% sodium hydroxide solution was added to a mixture comprising 50 cc. of water and 500 cc. of discolored methyl ethyl ketone which had been recovered from a commercial coating process and which had been rendered unfit for further use by the presence of colored oxidation products, including about 0.2% of diacetyl. The mixture of impure methyl ethyl ketone was then refluxed for thirty minutes, diluted with 50 cc. of water, and the purified solvent distilled overhead. The recovery of pure methyl ethyl ketone was 98.5%. The product was water-white in color and contained less than 0.001% of diacetyl.

I claim as my invention:

1. A process for the purification and decolorization of methyl ethyl ketone which is discolored by the presence of a color-imparting alpha-diketone, which comprises mixing with the impure methyl ethyl ketone a sufficient amount of a dilute aqueous solution of sodium hydroxide to result in the formation of a mixture which contains from about 0.1% to about 5.0% of sodium hydroxide, subjecting the said mixture for from about 15 minutes to about 1 hour to an elevated temperature which is substantially the boiling temperature of the methyl ethyl ketone whereby said alpha-diketone is selectively converted to a resinous product of high boiling point, and distilling the said mixture to separate the purified and decolorized methyl ethyl ketone therefrom.

2. A process for the purificaton and decolorization of methyl ethyl ketone which is discolored by the presence of an alpha-diketone, which comprises treating the discolored methyl ethyl ketone under non-oxidizing conditions at an elevated temperature with an aqueous solution of an alkali metal carbonate until the action of the alkali metal carbonate on the color-imparting alpha-diketone is substantially complete and said alpha-diketone is selectively resinified, and distilling the resulting mixture to separate the purified and decolorized methyl ethyl ketone therefrom.

3. A process for the purification and decolorization of methyl ethyl ketone which is discolored by the presence of a color-imparting diketone resulting from air oxidation of said ketone, which comprises contacting the discolored methyl ethyl ketone with an effective amount of a basic alkali metal compound until said oxidation products are resinified, and separating the purified methyl ethyl ketone.

4. A process for the purification and decolorization of an aliphatic ketone which is discolored by the presence of a color-imparting alpha-diketone, which comprises mixing with the impure aliphatic ketone a sufficient amount of a dilute aqueous solution of sodium hydroxide to result in the formation of a mixture which contains from about 0.1% to about 5.0% of sodium hydroxide, subjecting the said mixture under non-oxidizing conditions for from about 15 minutes to about 1 hour to an elevated temperature which is substantially the boiling temperature of the aliphatic ketone whereby said diketone is resinified, and distilling the said mixture to separate the purified and decolorized aliphatic ketone therefrom.

5. A process for the purification and decolorization of an aliphatic ketone which is discolored by the presence of a color-imparting diketone resulting from air oxidation of said ketone, which comprises treating the discolored aliphatic ketone at an elevated temperature with an aqueous solution of an alkali metal hydroxide until the action of the alkali metal hydroxide on the color-imparting oxidation products is substantially complete and said diketone is selectively resinified, and distilling the resulting mixture to separate the purified and decolorized aliphatic ketone therefrom.

6. A process for the purification and decolorization of an aliphatic ketol which is discolored by the presence of a color-imparting diketone resulting from air oxidation of said ketol, which comprises treating the discolored aliphatic ketol at an elevated temperature with an aqueous solution of an alkali metal carbonate until the action of the alkali metal carbonate on the color-imparting oxidation products is substantially complete and said diketone is selectively resinified, and distilling the resulting mixture to separate the purified and decolorized aliphatic ketol therefrom.

7. A process for the purification and decolorization of a ketol which is discolored by the presence of a color-imparting alpha-diketone, which comprises treating the discolored aliphatic ketol at an elevated temperature with an aqueous solution of an alkali metal hydroxide until the action of the alkali metal hydroxide on the color-imparting alpha-diketone is substantially complete and said diketone is selectively resinified, and distilling the resulting mixture to separate the purified and decolorized aliphatic ketol therefrom.

8. A process for the purification and decolorization of a mixture comprising aliphatic ketones and aliphatic ketols which is discolored by the presence of an alpha-diketone, which comprises treating the discolored material with a basic-acting metal compound until the action of the basic-acting metal compound upon the alpha-diketone is substantially complete whereby said alpha-diketone is selectively converted to a resinous product of high boiling point, and separating the purified mixture of aliphatic ketones and ketols.

9. A process for the purification and decolorization of a compound of the group consisting of the ketones and ketols which are discolored by the presence of a color-imparting alpha-diketone, which comprises treating the discolored compound with a basic-acting metal compound until the action of the basic-acting metal compound on the color-imparting alpha-diketone is substantially complete and said alpha-diketone is selectively resinified.

10. A process for the purification and decolorization of a compound of the group consisting of the ketones and ketols which are discolored by the presence of an alpha-diketone, which comprises treating the discolored compound with an alkali metal hydroxide at an elevated temperature until the action of the alkali metal hydroxide on the color-imparting alpha-diketone is substantially complete and said diketone is selectively resinified, and separating the purified and decolorized compound from the resulting mixture.

11. A process for the purification and decolorization of a compound of the group consisting of the ketones and ketols which are discolored by the presence of color-imparting products of air oxidation of said compound, which comprises mixing with the impure compound a sufficient amount of a dilute aqueous solution of sodium hydroxide to result in the formation of a mixture which contains from about 0.1% to about 5.0% of sodium hydroxide, subjecting the said mixture for from about 15 minutes to about 1 hour to an elevated temperature which is substantially the boiling temperature of the compound whereby said color-imparting products of oxidation are resinified, and distilling the said mixture to separate the purified and decolorized compound therefrom.

LESLIE M. PETERS.

REFERENCES CITED

The following references are of record in the file of this patent:

UNITED STATES PATENTS

| Number | Name | Date |
|---|---|---|
| 2,083,856 | Marovec | June 15, 1937 |
| 2,204,956 | Bresler et al. | June 18, 1940 |
| 2,254,615 | McAllister | Sept. 2, 1941 |

FOREIGN PATENTS

| Number | Country | Date |
|---|---|---|
| 386,181 | France | Apr. 17, 1908 |